(12) United States Patent
Moore et al.

(10) Patent No.: US 10,196,902 B2
(45) Date of Patent: Feb. 5, 2019

(54) COOLING FOR GAS TURBINE ENGINE COMPONENTS

(71) Applicant: United Technologies Corporation, Farmington, CT (US)

(72) Inventors: Sasha M. Moore, East Hartford, CT (US); Timothy J. Jennings, South Windsor, CT (US); Thomas N. Slavens, Vernon, CT (US); Clifford J. Musto, West Hartford, CT (US); Nicholas M. LoRicco, Coventry, CT (US); Carey Clum, East Hartford, CT (US); John McBrien, South Glastonbury, CT (US); Christopher Whitfield, Manchester, CT (US); San Quach, East Hartford, CT (US)

(73) Assignee: UNITED TECHNOLOGIES CORPORATION, Farnington, CT (US)

( * ) Notice: Subject to any disclaimer, the term of this patent is extended or adjusted under 35 U.S.C. 154(b) by 420 days.

(21) Appl. No.: 14/854,606

(22) Filed: Sep. 15, 2015

(65) Prior Publication Data

US 2016/0201475 A1   Jul. 14, 2016

Related U.S. Application Data

(60) Provisional application No. 62/050,435, filed on Sep. 15, 2014.

(51) Int. Cl.
| | |
|---|---|
| *F01D 5/18* | (2006.01) |
| *F01D 9/04* | (2006.01) |
| *F01D 25/12* | (2006.01) |
| *F04D 29/32* | (2006.01) |
| *F01D 9/06* | (2006.01) |

(52) U.S. Cl.
CPC ............ *F01D 5/187* (2013.01); *F01D 5/186* (2013.01); *F01D 9/041* (2013.01); *F01D 9/065* (2013.01);
(Continued)

(58) Field of Classification Search
CPC ...................................................... F01D 5/186
See application file for complete search history.

(56) References Cited

U.S. PATENT DOCUMENTS

| | | | |
|---|---|---|---|
| 4,684,323 A | 8/1987 | Field | |
| 5,062,768 A * | 11/1991 | Marriage | ................ F01D 5/186 29/889.721 |

(Continued)

FOREIGN PATENT DOCUMENTS

| | | |
|---|---|---|
| EP | 0375175 A1 | 6/1990 |
| EP | 1655453 A1 | 5/2006 |

OTHER PUBLICATIONS

European Search Report for Application No. 15185341 dated Jan. 15, 2016.

*Primary Examiner* — Justin Seabe
(74) *Attorney, Agent, or Firm* — Cantor Colburn LLP

(57) ABSTRACT

A gas turbine engine component includes a body with a wall surrounding an interior cavity. The wall has opposed interior and exterior surfaces. The interior surface has a plurality of coolant inlets and the exterior surface has a coolant outlet defined therein. A coolant conduit extends between the coolant inlets and the coolant outlet and is configured and adapted to induce secondary flow vortices in coolant traversing the coolant conduit and in an adherent coolant film over a portion of the exterior surface of component body.

14 Claims, 5 Drawing Sheets

(52) U.S. Cl.
CPC ........... *F01D 25/12* (2013.01); *F04D 29/321* (2013.01); *F05D 2220/32* (2013.01); *F05D 2240/12* (2013.01); *F05D 2240/127* (2013.01); *F05D 2240/30* (2013.01); *F05D 2240/81* (2013.01); *F05D 2260/202* (2013.01); *F23R 2900/03042* (2013.01); *Y02T 50/676* (2013.01)

(56) References Cited

U.S. PATENT DOCUMENTS

| | | | |
|---|---|---|---|
| 5,688,107 A * | 11/1997 | Downs | F01D 5/18 415/173.1 |
| 7,273,351 B2 * | 9/2007 | Kopmels | F01D 5/186 416/97 R |
| 7,351,036 B2 | 4/2008 | Liang | |
| 7,789,625 B2 * | 9/2010 | Liang | F01D 5/186 415/115 |
| 7,866,950 B1 | 1/2011 | Wilson, Jr. | |
| 8,047,789 B1 | 11/2011 | Liang | |
| 8,057,183 B1 | 11/2011 | Liang | |
| 8,066,483 B1 | 11/2011 | Liang | |
| 8,092,176 B2 | 1/2012 | Liang | |
| 8,096,766 B1 | 1/2012 | Downs | |
| 8,109,726 B2 | 2/2012 | Liang | |
| 8,162,609 B1 | 4/2012 | Liang | |
| 8,317,475 B1 | 11/2012 | Downs | |
| 8,322,988 B1 | 12/2012 | Downs et al. | |
| 8,672,613 B2 | 3/2014 | Bunker | |
| 2008/0279697 A1 | 11/2008 | Liang | |
| 2010/0003619 A1 | 1/2010 | Das et al. | |
| 2012/0087803 A1 | 4/2012 | Butler et al. | |
| 2013/0205791 A1 | 8/2013 | Mongillo, Jr. et al. | |

* cited by examiner

COOLING FOR GAS TURBINE ENGINE COMPONENTS

CROSS REFERENCE TO RELATED APPLICATIONS

This application claims the benefit of U.S. Provisional Patent Application Ser. No. 62/050,435 filed Sept. 15, 2014, the entire contents of which are incorporated herein by reference thereto.

BACKGROUND

The present disclosure relates to gas turbine engines, and more particularly to cooling gas turbine engine components.

Engine pressure ratio and temperature at the turbine section inlet influence gas turbine engine performance and efficiency. Performance advantage can be achieved since turbine combustors generate combustion products with temperatures greater than the melting point of the materials forming certain components in the combustor or turbine section. Conventional engines therefore employ cooling systems to allow engine turbine sections to run at temperatures above the melting point of the component materials without actually melting any components.

Cooling systems in conventional engines generally cool combustor and/or turbine section components by convection cooling, film-cooling, or by a combination of convection cooling and film-cooling. Convection cooling involves flowing coolant through a cooled component such that heat transfers from the component exterior, through the component, and into a coolant stream flowing through the component. Film-cooling generally involves flowing a film of coolant over the surface of the component. The film functions as a thermal insulator, separating the component from the hot gas while allowing mechanical communication between combustion products traversing the turbine section and turbine section components.

Such systems and methods are satisfactory for their intended purpose. However, there is still a need in the art for improved systems and methods for cooling gas turbine engine components. The present disclosure provides a solution for this need.

BRIEF DESCRIPTION

A gas turbine engine component includes a body with a wall surrounding an interior cavity. The wall has opposed interior and exterior surfaces. The interior surface has a plurality of coolant inlets and the exterior surface has a coolant outlet defined therein. A coolant conduit extends between the coolant inlets and the coolant outlet and is configured and adapted to induce secondary flow vortices in coolant traversing the coolant conduit and in an adherent coolant film over a portion of the exterior surface of component body.

In certain embodiments, a vortex chamber can be disposed between the interior and exterior surfaces. The vortex chamber can be in fluid communication with coolant outlet and with the plurality of coolant inlets. A vectoring segment can fluidly connect a first of the coolant inlets with the vortex chamber. A vortexing segment can fluidly connect a second of the plurality of coolant inlets with the vortex chamber. The vortexing segment can connect to the vortex chamber at an angle with respect to the vectoring segment for inducing off axis flow in coolant traversing the vortex chamber. The angle can be less than 90 degrees, and in certain embodiments is less than 45 degrees or any other suitable angle.

In accordance with certain embodiments, a metering flow segment can fluidly connect the vortex chamber with the coolant outlet. The metering segment can include a flow area that is smaller than combined flow areas of the vortexing and vectoring flow segments. It is contemplated that the coolant outlet can include a diffusor defined on the exterior surface of the component body. The diffusor can be in fluid communication with the coolant outlet. The diffusor can also be an interior diffusor defined between the interior surface and the external surface of the hollow body.

It is also contemplated that in certain embodiments the vortexing segment is a first vortexing segment, and a second vortexing segment can fluidly connect another of the coolant inlets with the vortex chamber. The second vortexing segment can also connect to the vortexing chamber at an angle with respect to the vectoring flow segment. It is also contemplated that the component can be a stator vane or a turbine blade, such as first stage turbine or stator blade for example.

A turbine blade includes a blade body with a wall bounding an interior cavity and having opposed interior and exterior surfaces and a film-cooling channel extending therebetween. The film-cooling channel has a coolant outlet defined by the exterior surface and a plurality of coolant inlets in fluid communication with the coolant outlet. The film-cooling channel is configured and adapted to induce secondary flow vortices within the film-cooling channel for cooling the exterior surface of the turbine blade and is in fluid communication with the interior through the plurality of coolant inlets such that coolant issuing from the coolant outlet adheres to the exterior surface of the component body.

In one embodiment, a gas turbine engine component is provided. The gas turbine component having: a wall having an interior surface, an exterior surface opposite the interior surface, and a film-cooling channel extending between the interior surface and exterior surface, the film-cooling channel including: a coolant outlet defined in the exterior surface; a vortex chamber in fluid communication with the coolant outlet; and a plurality of coolant inlets defined in the interior surface, wherein the vortex chamber is configured and adapted for inducing secondary flow vortices in coolant traversing the film-cooling channel such that an adherent coolant film issues from the outlet and over at least a portion of the exterior surface.

In addition to one or more of the features described above, or as an alternative to any of the foregoing embodiments, further embodiments may include a diffusor defined in the wall and in fluid communication with the coolant outlet.

In addition to one or more of the features described above, or as an alternative to any of the foregoing embodiments, further embodiments may include a vectoring segment fluidly connecting a first of the plurality of coolant inlets with the vortex chamber.

In addition to one or more of the features described above, or as an alternative to any of the foregoing embodiments, further embodiments may include a vortexing segment fluidly connecting a second of the plurality of coolant inlets with the vortex chamber.

In addition to one or more of the features described above, or as an alternative to any of the foregoing embodiments, further embodiments may include a vortexing segment wherein the vortexing segment joins the vortex chamber at an angle with respect to the vectoring segment.

In addition to one or more of the features described above, or as an alternative to any of the foregoing embodiments, further embodiments may include a gas turbine engine component, wherein the angle is less than about 45 degrees.

In addition to one or more of the features described above, or as an alternative to any of the foregoing embodiments, further embodiments may include a gas turbine engine component, wherein the vortexing segment is a first vortexing segment, and further including a second vortexing segment fluidly connecting a third of the plurality of coolant inlets with the vortex chamber.

In addition to one or more of the features described above, or as an alternative to any of the foregoing embodiments, further embodiments may include a metering segment fluidly connecting the vortex chamber with the coolant outlet.

In addition to one or more of the features described above, or as an alternative to any of the foregoing embodiments, further embodiments may include a gas turbine engine component, wherein a flow area defined by the metering segment is less than an aggregate of flow areas defined by the vectoring and vortexing segments.

In addition to one or more of the features described above, or as an alternative to any of the foregoing embodiments, further embodiments may include a gas turbine engine component, wherein the metering segment includes a settling length connected to the vortex chamber.

In addition to one or more of the features described above, or as an alternative to any of the foregoing embodiments, further embodiments may include a gas turbine engine component, wherein the metering segment includes a development length connected between settling length and the outlet.

In addition to one or more of the features described above, or as an alternative to any of the foregoing embodiments, further embodiments may include a gas turbine engine is a rotor blade or stator vane.

In another embodiment, an airfoil for a gas turbine engine is provided. The airfoil having: a wall bounding an interior cavity, wherein the wall has an interior surface, an exterior surface opposite the interior surface, and a film-cooling channel extending between the interior surface and exterior surface, the film-cooling channel including: a coolant outlet defined in the exterior surface; a vortex chamber in fluid communication with the coolant outlet; and a plurality of coolant inlets defined in the interior surface fluidly connecting the blade body interior cavity with the exterior surface, wherein the vortex chamber is configured and adapted for inducing secondary flow vortices in coolant traversing the film-cooling channel such that an adherent an coolant film issues from the outlet and over at least a portion of the exterior surface.

In addition to one or more of the features described above, or as an alternative to any of the foregoing embodiments, further embodiments may include an airfoil further including a vectoring segment fluidly connecting a first of the plurality of coolant inlets with the vortex chamber.

In addition to one or more of the features described above, or as an alternative to any of the foregoing embodiments, further embodiments may include an airfoil further including a vortexing segment fluidly connecting a second of the plurality of coolant inlets with the vortex chamber.

In addition to one or more of the features described above, or as an alternative to any of the foregoing embodiments, further embodiments may include an airfoil wherein the interior cavity is a first interior cavity and further including a second interior cavity defined within the blade body, wherein the vectoring segment fluidly connects the first interior cavity to the vortex chamber and the vortexing segment fluidly connects the second interior cavity to the vortex chamber.

In addition to one or more of the features described above, or as an alternative to any of the foregoing embodiments, further embodiments may include an airfoil further, wherein the vortexing segment is a first vortexing segment, and further including a second vortexing segment in fluid communication with the vortex chamber.

In addition to one or more of the features described above, or as an alternative to any of the foregoing embodiments, further embodiments may include an airfoil further including a metering segment with a settling length and a development length fluidly connecting the vortex chamber with the coolant outlet.

In addition to one or more of the features described above, or as an alternative to any of the foregoing embodiments, further embodiments may include an airfoil, wherein a flow area defined by the metering segment is less than an aggregate of flow areas defined by the vectoring and vortexing segments.

In yet another embodiment, a gas turbine engine is provided. The gas turbine engine having: a compressor section; a gas turbine engine component in fluid communication with the compressor section through a coolant conduit, the gas turbine engine component including: a wall bounding an interior cavity, wherein the wall has an interior surface, an exterior surface opposite the interior surface, and a film-cooling channel extending between the interior surface and exterior surface, the film-cooling channel including: a coolant outlet defined in the exterior surface; a vortex chamber in fluid communication with the coolant outlet; and a plurality of coolant inlets defined in the interior surface fluidly connecting the interior cavity with the exterior surface, wherein the vortex chamber is in fluid communication with the compressor section through the coolant inlets for issuing an adherent cooling film over an exterior portion of the gas turbine engine component exterior surface.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
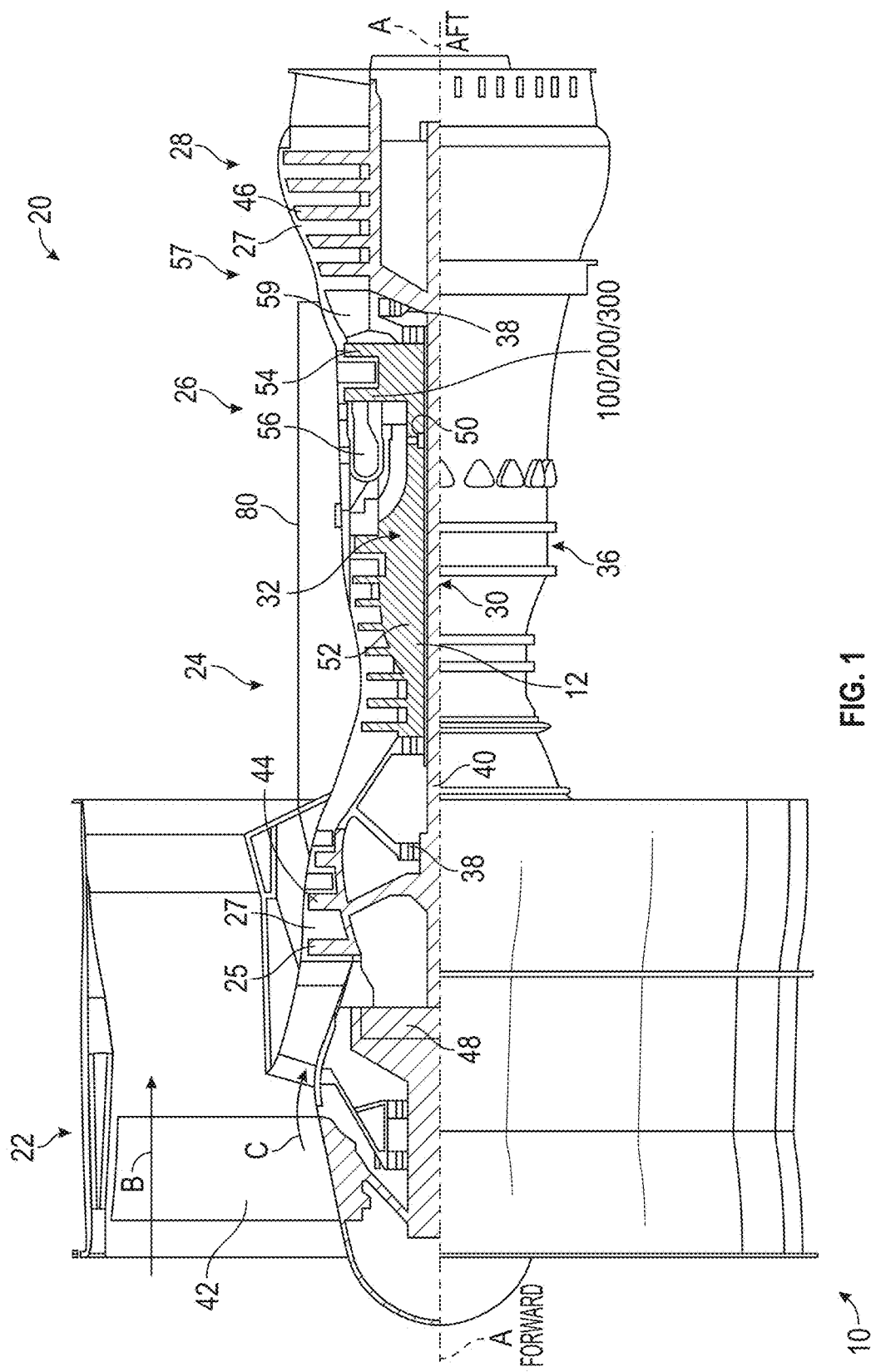
FIG. 1 is a cross-sectional side elevation view of an exemplary embodiment of a gas turbine engine constructed in accordance with the present disclosure, showing a cooling system connecting the engine compressor to a cooled component in the engine turbine section.

Reference will now be made to the drawings wherein like reference numerals identify similar structural features or aspects of the subject disclosure. For purposes of explanation and illustration, and not limitation, a partial view of an exemplary embodiment of a gas turbine engine component in accordance with the disclosure is shown in FIG. 1 and is designated generally by reference character 100. Other embodiments of gas turbine engine components in accordance with the disclosure, or aspects thereof, are provided in FIGS. 2-5, as will be described. The systems and methods described herein can be used for in marine, terrestrial, and aerospace gas turbine engine applications, such as aircraft main engine and auxiliary engines.

With reference to FIG. 1, gas turbine engine 10 is shown. As described herein, gas turbine engine 10 is a two-spool turbofan engine that generally incorporates a fan section 22, a compressor section 24, a combustor section 26 and a turbine section 28. Other exemplary engines might include an augmentor section (not shown) among other systems or features. Fan section 22 drives air along a bypass flow path B. Compressor section 24 drives air along a main gas path C for compression and communication into combustor section 26 and subsequent expansion through turbine section 28. Although depicted as a turbofan gas turbine engine, it is to be understood and appreciated that the concepts described herein are not limited to use with turbofans as the teachings may be applied to other types of turbine engines, such as three-spool gas turbine engine architectures.

Gas turbine engine 10 generally includes a rotor 12 divided into a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided.

Low-speed spool 30 generally includes an inner shaft 40 that interconnects a fan 42, a low-pressure compressor 44 and a low-pressure turbine 46. Inner shaft 40 may be connected to fan 42 directly or through a geared architecture 48 to drive fan 42 at a rotation speed lower than a rotation speed of low-speed spool 30, such as with a gear reduction ratio of, for example, about at least 2.3:1. High-speed spool 32 includes an outer shaft 50 that interconnects a high-pressure compressor 52 and high-pressure turbine 54. Combustor section 26 includes a combustor 56 arranged between high-pressure compressor 52 and high-pressure turbine 54. Inner shaft 40 and outer shaft 50 are concentric and configured for rotation about longitudinal axis A. Longitudinal axis A defines a central rotation axis about which rotation components, e.g. low-speed spool 30 and high-speed spool 32, rotate and which is collinear with respective longitudinal axes of inner shaft 40 and outer shaft 50.

Low-speed spool 30 and high-speed spool 32 define a main gas path extending between forward and aft ends of gas turbine engine 10. Air traversing main gas path C is compressed to by low-pressure compressor 44 and communicated to high-pressure compressor 52. High-pressure compressor 52 further compresses air traversing main gas path C and communicates core airflow C to combustor section 26. Fuel is added to air traversing main gas path C and the mixture ignited in combustor 56, the air thereby undergoing further pressurization and forming combustion products. Combustor 56 communicates the combustion products within the air traversing main gas path C into high-pressure turbine 54 and low-pressure turbine 46. High-pressure turbine 54 and low-pressure turbine 46 successively expand the combustion products with the air traversing main gas path C, extract work therefrom, and rotationally drive low-speed spool 30 and high-speed spool 32. Low-speed spool 30 and high-speed spool 32 in turn rotate fan 42. Rotation of fan 42 generates bypass airflow B and provides thrust.

A coolant conduit 80 extends between compressor section 24 and turbine section 28 and is configured and adapted for conveying a secondary gas flow from compressor section 24 to turbine section 28. The secondary gas flow provides coolant to turbine section 28 for cooling gas turbine engine components 100/200/300, e.g. turbine blades. It is to be understood and appreciated that, although illustrated as connecting high-pressure compressor 52 with high-pressure turbine 54, coolant conduit 80 can alternatively fluidly connect high-pressure compressor 52 with low-pressure turbine 46. It is also to be understood and appreciated that coolant conduit 80 can fluidly connect low-pressure compressor 44 with either high-pressure turbine 54 or low-pressure turbine 46 for cooling components like turbine rotor blades or stator blades disposed therein.

Gas turbine engine 10 is typically assembled in build groups or modules. In the illustrated embodiment, low-pressure compressor 44 includes three stages, high-pressure compressor 52 includes eight stages, high-pressure turbine 54 includes two stages, and low-pressure turbine includes five stages, respectively, stacked in an axial arrangement. It should be appreciated, however, that any suitable number of stages can be used. Further, other gas turbine architectures such as three-spool architecture with an intermediate spool can also benefit from the improvements disclosed herein.

Figure 2:
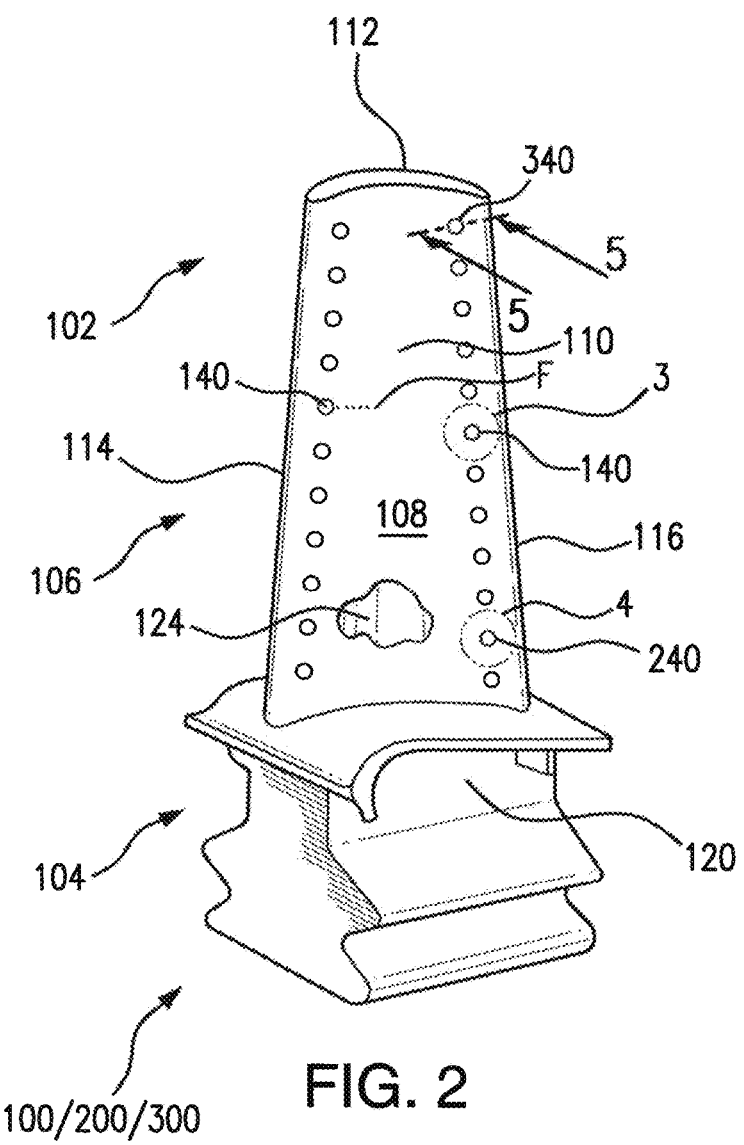
FIG. 2 is a perspective view of the gas turbine engine component of FIG. 1, showing coolant outlets defined by an exterior of the component.

With reference to FIG. 2, a gas turbine engine component 100 is shown. Gas turbine engine component 100 is illustrated for purposes of explanation and not for limitation as a rotor blade for turbine section 28 of gas turbine engine 10. For example, in embodiments, gas turbine engine component 100 is a rotor blade or stator vane in a turbine section or a compressor section, a component in a combustor section, or any component of gas turbine engine 10 exposed to high temperatures and potentially benefiting from film-cooling.

Gas turbine engine component 100 includes a hollow body 120 a tip portion 102, a root portion 104, and an airfoil portion 106 extending between tip portion 102 and root portion 104. Airfoil portion 106 has a pressure surface 110 and opposed suction surface 112. Pressure surface 110 and suction surface 112 span between a leading edge 114 and a trailing edge 116 of airfoil portion 106. At least one of pressure surface 110 and suction surface 112 have a coolant outlet 140 defined therein that is configured and adapted to issue an adhering coolant film F on the respective surface. Coolant film F insulates gas turbine engine component 100 from high temperature combustion products traversing turbine section 28. It is to be understood that either or both of pressure surface 110 and suction surface 112 can include a plurality of coolant outlets 140 as suitable for an intended application.

Figure 3:
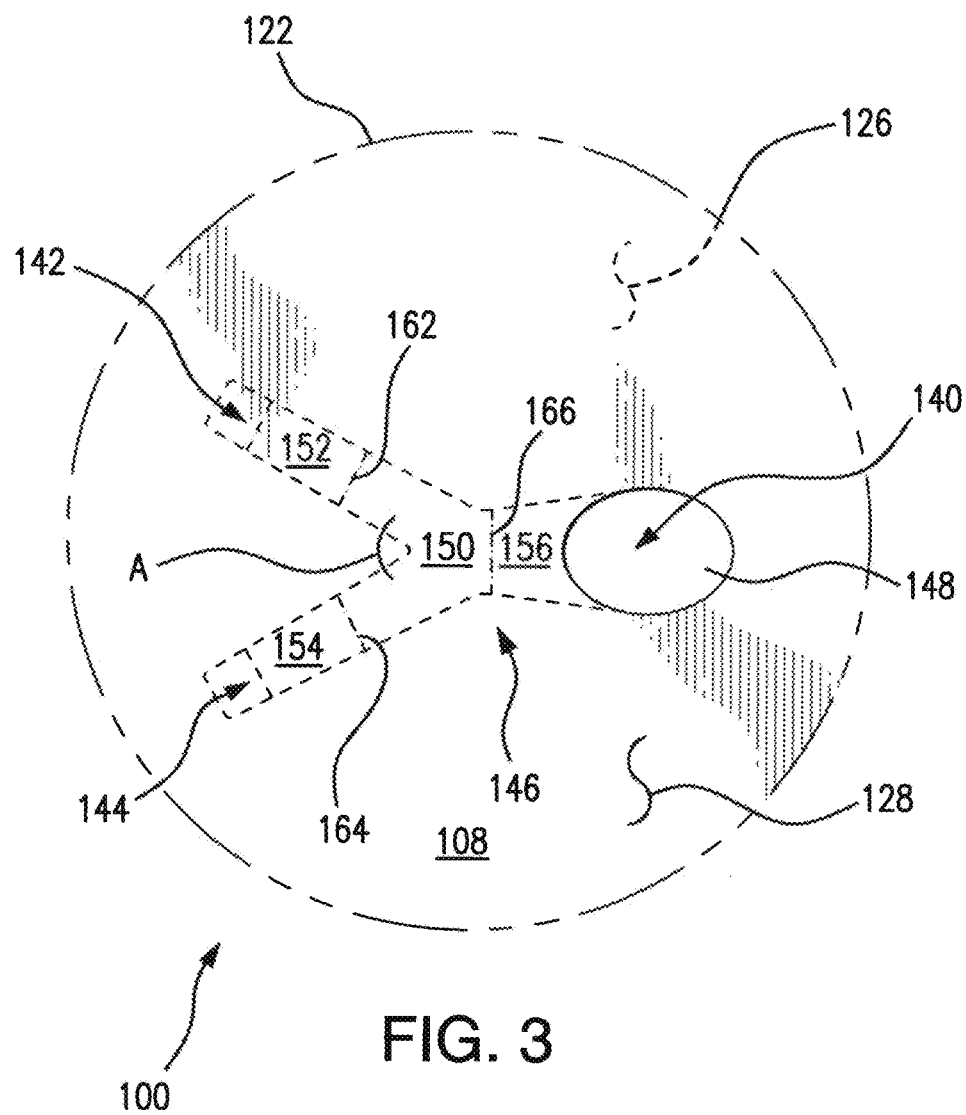
FIG. 3 is a schematic cross-sectional view of the gas turbine engine component of FIG. 1, showing a film-cooling channel with a vectoring segment and a vortexing segment.

With reference to FIG. 3, a schematic cross-section of gas turbine engine component 100 is shown. Gas turbine engine component 100 includes with a wall 122 bounding an interior cavity 124 and separating interior cavity 124 from core flow path C. Wall 122 has an interior surface 126 and an opposed exterior surface 128. Exterior surface 128 bounds core flow path C and defines coolant outlet 140. Interior surface 126 bounds interior cavity 124 and defines a plurality of coolant inlets, e.g. a first coolant inlet 142 and a second coolant inlet 144. Coolant outlet 140 is in fluid communication with first coolant inlet 142 and second coolant inlet 144 through a film-cooling channel 146 defined within wall 122.

Film-cooling channel 146 includes a vortex chamber 150, a vectoring segment 152, a vortexing segment 154, and a metering segment 156. Vortex chamber 150 is bounded by the interior of wall 122 and forms a cavity within which flows from vectoring segment 152 and vortexing segment 154 join. In contrast to a simple orifice plate, vortex chamber 150 has sufficient chamber volume such that flows from the vectoring segment 152 and vortexing segment 154 intermix and issue as a combined flow with a tangential velocity component into metering segment 156. Vortex chamber 150 is configured and adapted for inducing swirl in coolant traversing film-cooling channel 146. In the illustrated embodiment, additional swirling is effected by an angle A at which vortexing segment 154 connects to vortex chamber 150 in relation to vectoring segment 152. This induces off axis flow in coolant traversing vortex chamber 150, altering the vector the coolant would otherwise have absent the convergence of fluid from the respective segments.

In embodiments, angle A can be less than 90 degrees. In certain embodiments, angle A is less than 45 degrees. This can allow for controlling the magnitude of the tangential velocity component injected into the coolant flow for a given available vortexing flow pressure.

Vectoring segment 152 fluidly connects a first of the plurality of coolant inlets, i.e. first coolant inlet 142, with vortex chamber 150. Vectoring segment 152 directs a flow with a dominant velocity component into vortex chamber 150.

Vortexing segment 154 fluidly connects a second of the plurality of coolant inlets, i.e. second coolant inlet 144, with vortex chamber 150. Vortexing segment 154 directs a flow with modulating velocity component into vortex chamber 150. This flow joins with and imparts a tangential velocity component to flow introduced into vortex chamber 150 by vectoring segment 152. This swirls the flow entering metering segment 156 from vortex chamber 150.

Vectoring segment 152 defines a minimum flow area 162, vortexing segment 154 defines a minimum flow area 164, and metering segment 156 defines a metering flow area 166. Metering flow area 166 is less than an aggregate of flow area 162 and flow area 164. Dimensional control of metering flow area 166 limits coolant flow through film-cooling channel 146. Optionally, film-cooling channel 146 includes a diffusor segment 148 arranged between metering segment 156 and coolant outlet 140. Diffusor segment 148 forms a portion of film-cooling channel 146 wherein the flow area of the film-cooling channel expands.

Swirling the coolant within film-cooling channel 146 discourages in-hole separation of the coolant flow, thereby providing superior in-hole attachment and fill in coolant outlet 140. This potentially reduces the amount of coolant necessary to achieve a given amount of cooling in relation to conventional cooled turbine components. It is to be understood and appreciated that gas turbine engine component 100 can include any suitable number of film-cooling channels 146 fluidly coupling interior cavities of gas turbine engine component 100 with the external environment.

Figure 4:
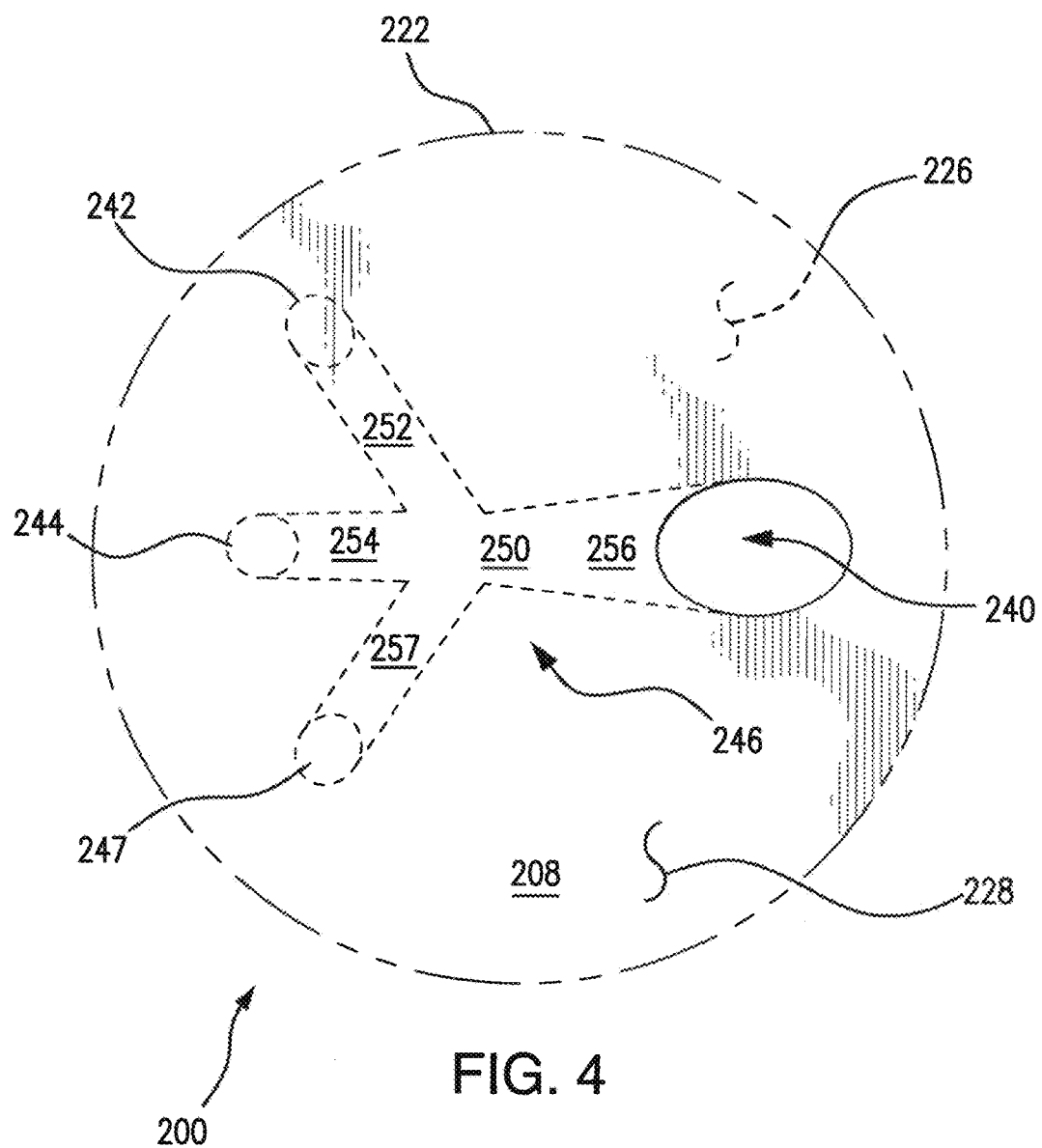
FIG. 4 is a schematic cross-sectional view of another embodiment of a gas turbine engine component, showing a film-cooling channel with a plurality of vectoring segments.

With reference to FIG. 4, a gas turbine engine component 200 is shown. Gas turbine engine component 200 is similar to gas turbine engine component 100 with and additionally includes a first vortexing segment 254 and a second vortexing segment 257. Second vortexing segment 257 fluidly connects a third of the plurality of coolant inlets, i.e. a third coolant inlet 247 with vortex chamber 250. Vortex chamber 250 joins vectoring segment 252 with first vortexing segment 254 and second vortexing segment 257 for imparting swirl in a flow of coolant traversing film-cooling channel 246. It is contemplated that second vortexing segment 257 increases the off axis swirl within the fluid, increasing fill within film cooling channel 256 and improving film adhesion to exterior surface 228.

Figure 5:
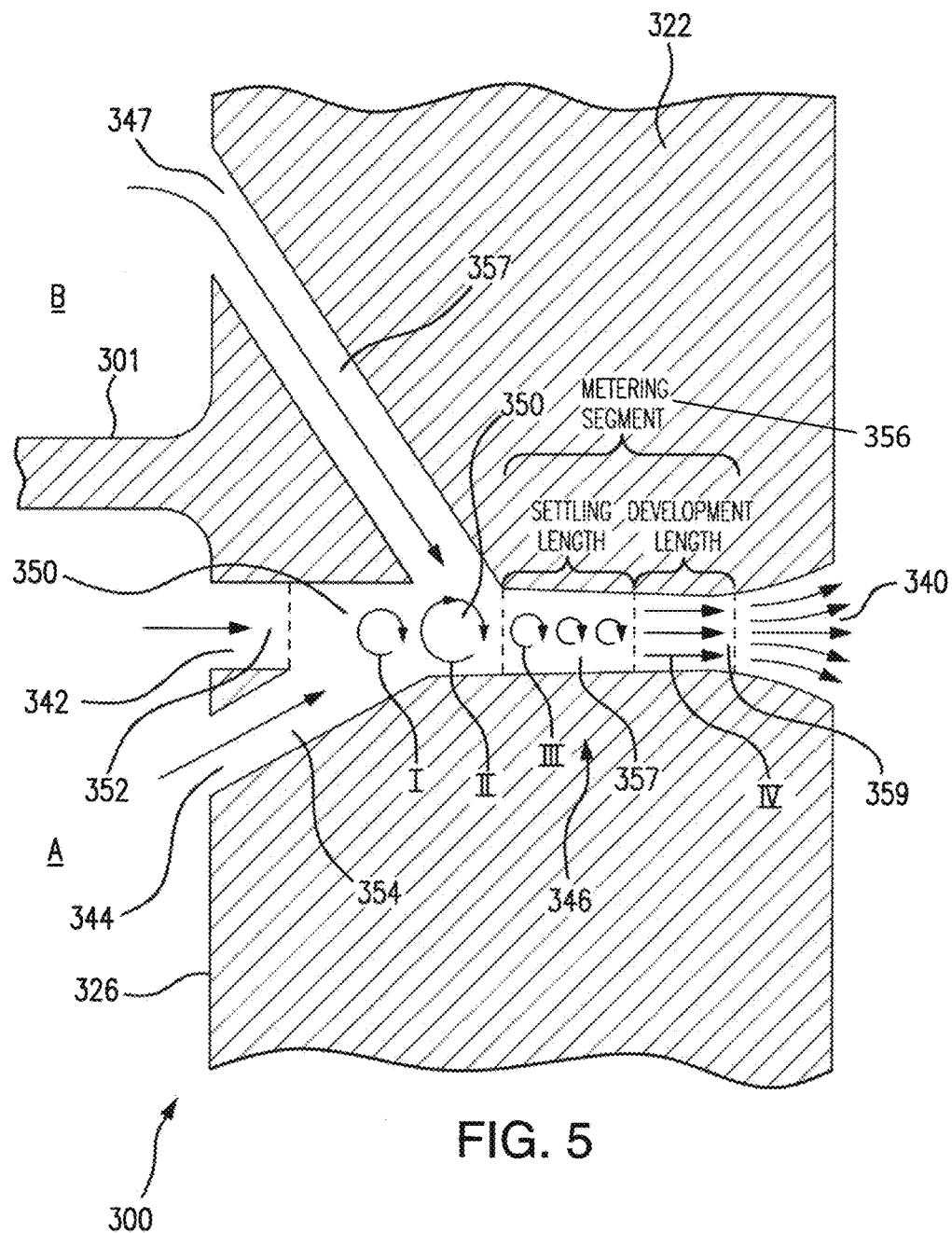
FIG. 5 is a schematic cross-sectional view of a portion of cooled gas turbine engine component, showing a vectoring segment and a plurality of vortexing segments fluidly connecting separate interior cavities with a vortex chamber.

With reference to FIG. 5, a gas turbine engine component 300 is shown. Gas turbine engine component 300 is similar to gas turbine engine component 200 with two differences. First, gas turbine engine component 300 defines within its interior a plurality of interior cavities. In the illustrated exemplary embodiment, gas turbine engine component 300 includes a first cavity A and a second cavity B. First cavity A is separated from second cavity B by an internal divider 301 extending therebetween. First vortexing segment 354 connects first cavity A with vortex chamber 350. This places vortex chamber 350 in fluid communication with first cavity A and imparts a first tangential velocity component, i.e. swirl I, into coolant entering vortex chamber 350 through vectoring segment 352. Second vortexing segment 357 connects second cavity B with vortex chamber 350. This places vortex chamber 350 in fluid communication with second cavity B and imparts a second tangential velocity component, i.e. swirl II, into coolant traversing vortex chamber 350. Providing coolant through a plurality of vortexing channels can provide pressure balancing and/or accommodate coolant pressure drop associated with cavity shape.

Second, metering segment 356 includes a plurality of discrete segment portions. In particular, metering segment 356 includes a settling length 357 with a discrete length and a development length 359 with a further discrete length. Settling length 357 is connected to vortex chamber 350, places vortex chamber 350 in fluid communication with development length 359, and provides a contiguous channel length wherein the tangential velocity component distributes coolant against the surface of metering segment 356. This allows for the coolant to develop a relatively uniform flow velocity and fill film-cooling channel 346. Development length 359 is connected to settling length 357, places settling length 357 in fluid communication with outlet 340, and provides a contiguous channel length wherein the coolant develops a substantially uniform boundary layer adjacent to the film-cooling channel wall. These can allow coolant to issue from outlet 340 as an adherent film, improving the insulating effectiveness of the film over the exterior surface of gas turbine engine component 300. Although illustrated in conjunction with exemplary gas turbine engine component 300, gas turbine engine component 100 (shown in FIG. 3) and gas turbine engine component 200 (shown in FIG. 4) can also include respective settling lengths and development lengths.

It is contemplated that embodiments of gas turbine engine components, e.g. gas turbine engine component 100, gas turbine engine component 200, and gas turbine engine component 300, including film-cooling channels with at least one non-linear segment. Such components can be constructed as single crystal, integral forgings without using material removal processes. For example, a mold insert can be formed defining the film-cooling channel including the above-described channel segments, a directionally single crystal casting formed about the insert, and the insert removed thereafter. A method of forming such single crystal castings is described in U.S. Patent Application Publication No. 2010/0003619 to Das et al., the contents of which are incorporated herein by reference, wherein a direct build of a ceramic pour mold with a one piece interior is described. This allows for defining film-cooling channels with complex geometries while retaining the material properties of conventional single crystal super alloys.

In embodiments, film-cooling channels with multiple discrete coolant inlets establishes an in-channel coolant flow with reduced in-channel recirculation. In embodiments with diffusors, multiple discrete coolant inlets fluidly connected with a single coolant outlet can provide a coolant flow with reduced recirculation within the diffusor segment of the film-cooling channel. This can prevent migration of the coolant flow to the top wall of the diffuser, potentially allowing ingestion of combustion products into the film-cooling channel. Instead, the multiple coolant inlets drive a film-cooling flow through the film-cooling channel to provide additional cooling and vortexing within the core flow of the film hole, thereby providing flow conditioning. The flow conditioning in turn can provide enhanced in-hole attachment and better coolant fill within the film-cooling channel and, in certain embodiments, the diffusor portion of the film-cooling channel. It can enhance the strength of the perforated structure housing the film-cooling channel.

The methods and systems of the present disclosure, as described above and shown in the drawings, provide for gas turbine engine components with superior properties including tolerance for exposure to high temperature gas flows. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A gas turbine engine component, comprising:
a wall having a plurality of surfaces including an interior surface and an exterior surface opposite the interior surface, wherein the interior surface is an upstream surface and the exterior surface is a downstream surface, the interior surface facing an interior portion of the component, and
a film-cooling channel extending between the interior surface and exterior surface, the film-cooling channel including:
a primary passage having a primary inlet along the interior surface and a primary outlet along the exterior surface to form a primary flow vector on a primary axis, and
a plurality passage segments having a respective plurality of segment inlets along the interior surface and a respective plurality of segment outlets, the plurality of segment outlets joining with the primary passage at mutually offset joining locations along the primary axis,
the plurality of passage segment forming a respective plurality of segment flow vectors, the plurality of segment flow vectors being on a respective plurality of segment axises that are mutually skewed and skewed from the primary axis, so that the plurality of streamwise joining locations within the primary passage form a respective plurality of vortex regions,
a metering segment downstream of the plurality of joining locations, wherein a flow area at an inlet of the metering segment is less than an aggregate of flow areas defined by the plurality of segment outlets, and
the metering segment including:
a flow settling segment fluidly connected to the inlet of the metering segment, and a flow development segment fluidly connected to the flow settling segment and the coolant outlet, the flow settling having a first discrete length to induce a uniform velocity therein, and the flow development segment having a second discrete length to induce a uniform boundary layer therein against the film-cooling channel, the second discrete length differing from the first discrete length.

2. The component as recited in claim 1, further including a diffusor defined in the wall and in fluid communication with the coolant outlet.

3. The component of claim. 1,
including a divider extending inwardly from the interior surface and into the interior portion to divide the interior portion into a plurality of internal cavities, including a first internal cavity and a second internal cavity, and
wherein
the primary inlet is disposed in the first internal cavity, and
the plurality of passage segments include a first segment having a first segment inlet, the first segment inlet being disposed in the second internal cavity.

4. The component of claim 3 wherein
the plurality passage segment include a second segment having a second segment inlet, the second segment inlet being disposed in the first internal cavity.

5. The component of claim 4 wherein the first segment is flow-wise longer than the second segment.

6. A component as recited in claim 1, wherein the gas turbine engine component is a rotor blade or stator vane.

7. An airfoil for a gas turbine engine, comprising:
a wall having a plurality of surfaces including an interior surface and an exterior surface opposite the interior surface, wherein the interior surface is an upstream surface and the exterior surface is a downstream surface, the interior surface facing an interior portion of the component, and
a film-cooling channel extending between the interior surface and exterior surface, the film-cooling channel including:
a primary passage having a primary inlet along the interior surface and a primary outlet along the exterior surface to form a primary flow vector on a primary axis, and
a plurality passage segments having a respective plurality of segment inlets along the interior surface and a respective plurality of segment outlets, the plurality of segment outlets joining with the primary passage at mutually offset joining locations along the primary axis,
the plurality of passage segments forming a respective plurality of segment flow vectors, the plurality of segment flow vectors being on a respective plurality of segment axises that are mutually skewed and skewed from the primary axis, so that the plurality of streamwise joining locations with the primary passage form a respective plurality of vortex regions,
a metering segment downstream of the plurality of joining locations, wherein a flow area at an inlet of the metering segment is less than an aggregate of flow areas defined by the plurality of segment outlets, and the metering segment including:

a flow settling segment fluidly connected to the inlet of the metering segment, and a flow development segment fluidly connected to the flow settling segment and the coolant outlet, the flow settling having a first discrete length to induce a uniform velocity therein, and the flow development segment having a second discrete length to induce a uniform boundary layer therein against the film-cooling channel, the second discrete length differing from the first discrete length.

8. The airfoil of claim 7 including a divider extending inwardly from the interior surface and into the interior portion to divide the interior portion into a plurality of internal cavities, including a first internal cavity and a second internal cavity, and wherein the primary inlet is disposed in the first internal cavity, and the plurality of passage segments include a first segment having a first segment inlet, the first segment inlet being disposed in the second internal cavity.

9. The airfoil of claim 8 wherein the plurality of passage segments include a second segment having a second segment inlet, the second segment inlet being disposed in the first internal cavity.

10. The airfoil of claim 9 wherein the first segment is flow-wise longer than the second segment.

11. A gas turbine engine, comprising:

a compressor section;

a gas turbine engine component in fluid communication with the compressor section through a coolant conduit, the gas turbine engine component including:

a wall having a plurality of surfaces including an interior surface and an exterior surface opposite the interior surface, wherein the interior surface is an upstream surface and the exterior surface is a downstream surface, the interior surface facing an interior portion of the component, and a film-cooling channel extending between the interior surface and exterior surface, a film-cooling channel including:

a primary passage having a primary inlet along the interior surface and a primary outlet along the exterior surface to form a primary flow vector on a primary axis, and a plurality passage segments having a respective plurality of segment inlets along the interior surface and a respective plurality of segment outlets, the plurality of segment outlets joining with the primary passage at mutually offset joining locations along the primary axis, the plurality of passage segments forming a respective plurality of segment flow vectors, the plurality of segment flow vectors being on a respective plurality of segment axises that are mutually skewed and skewed from the primary axis, so that the plurality of streamwise joining locations within the primary passage form a respective plurality of vortex regions, a metering segment downstream of the plurality of joining locations, wherein a flow area at an inlet of the metering segment is less than an aggregate of flow areas defined by the plurality of segment outlets, and the metering segment including:

a flow settling segment fluidly connected to the inlet of the metering segment, and a flow development segment fluidly connected to the flow settling segment and the coolant outlet, the flow settling having a first discrete length to induce a uniform velocity therein, and the flow development segment having a second discrete length to induce a uniform boundary layer therein against the film-cooling channel, the second discrete length differing from the first discrete length, and wherein the vortex chamber is in fluid communication with the compressor section through the coolant inlets.

12. The gas turbine engine of claim 11 including a divider extending inwardly from the interior surface and into the interior portion to divide the interior portion into a plurality of internal cavities, including a first internal cavity and a second internal cavity, and wherein the primary inlet is disposed in the first internal cavity, and the plurality of passage segments include a first segment having a first segment inlet, the first segment inlet being disposed in the second internal cavity.

13. The gas turbine engine of claim 12 wherein the plurality of passage segments include a second segment having a second segment inlet, the second segment inlet being disposed in the first internal cavity.

14. The gas turbine engine of claim 13 wherein the first segment is flow-wise longer than the second segment.

* * * * *